United States Patent [19]

Deatcher

[11] 4,111,882

[45] Sep. 5, 1978

[54] FLAME RETARDANT PLASTICIZER FORMULATION FOR POLYVINYL CHLORIDE CONTAINING DIMETHYL METHYLPHOSPHONATE FOR HAZE REDUCTION

[75] Inventor: John H. Deatcher, Lake Peekskill, N.Y.

[73] Assignee: Stauffer Chemical Company, Westport, Conn.

[21] Appl. No.: 724,424

[22] Filed: Sep. 17, 1976

[51] Int. Cl.$^2$ ............................ C08K 5/49; C09K 3/28
[52] U.S. Cl. .................................. 260/30.6 R; 252/8.1; 260/DIG. 24
[58] Field of Search ................... 260/DIG. 24, 30.6 R, 260/31.6; 252/8.1

[56] References Cited

U.S. PATENT DOCUMENTS

| | | | |
|---|---|---|---|
| 2,934,507 | 4/1960 | Chadwick | 260/23 |
| 3,064,031 | 11/1962 | Zimmerer | 260/461 |
| 3,480,701 | 11/1969 | Wieschede | 260/982 |
| 3,558,537 | 1/1971 | Hecker et al. | 260/30.6 R |
| 3,801,526 | 4/1974 | Lonning | 260/30.6 R |
| 3,812,073 | 5/1974 | Ito et al. | 260/30.6 R |

*Primary Examiner*—Joseph L. Schofer
*Assistant Examiner*—Peter F. Kulkosky
*Attorney, Agent, or Firm*—Richard P. Fennelly

[57] ABSTRACT

The haze values of polyvinyl chloride compositions containing a PVC compatible plasticizer/haloalkyl phosphate flame retardant composition are improved by incorporation of an effective amount of dimethyl methylphosphonate in such a composition for improvement of such haze values.

16 Claims, No Drawings

FLAME RETARDANT PLASTICIZER FORMULATION FOR POLYVINYL CHLORIDE CONTAINING DIMETHYL METHYLPHOSPHONATE FOR HAZE REDUCTION

BACKGROUND OF THE INVENTION

1. Field of the Invention

The present invention pertains to a PVC compatible plasticizer/haloalkyl phosphate flame retardant composition which has utility as a flame retardant plasticizer composition and which produces a product having good flame retardancy and a low haze value when it is incorporated in PVC formulations, e.g., flexible PVC films.

2. Description of the Prior Art

Plasticizer compositions containing a PVC compatible plasticizer and a haloalkyl phosphate flame retardant, e.g., a chlorinated or brominated $C_1-C_3$ alkyl phosphate, are known commercial products. Such flame retardant, plasticizer formulations are used in those applications in which a PVC formulation, e.g., a flexible vinyl film, needs both plasticization and flame retardancy. Unfortunately, flame retardant plasticizer compositions of this type, while increasing the flame retardancy of PVC formulations, also undesirably increase the haze values of such samples giving a cloudy product which has less clarity and "sparkle" than is commercially acceptable in some applications.

SUMMARY OF THE PRESENT INVENTION

Despite the vague teaching that various dialkyl alkylphosphonates are useful as plasticizers for synthetic resins (U.S. Pat. No. 3,064,031 to R. E. Zimmerer and U.S. Pat. No. 3,480,701 to K. Kleine-Weischede), as flame retardants in PVC (U.S. Pat. No. 3,728,138 to E. Kuehn) and as light stabilizers in non-flame retarded PVC (U.S. Pat. No. 2,934,507 to D. H. Chadwick et al.), no one has realized heretofore that the compound dimethyl methylphosphonate when incorporated in PVC compatible plasticizer/haloalkyl phosphate flame retardant blends will improve the haze values of PVC formulations containing such a blend. This effect is particularly surprising when one considers that the boiling point of dimethyl methylphosphonate (62°–63° C.) is lower than some of the processing temperatures used to form the PVC products and yet does not volatilize to any appreciable extent (e.g., less than a 5% by weight loss according to ASTM 1203-61T) from the blend containing it when that blend is in the PVC that is processed.

Technical Description of the Invention

The plasticizer formulation of the present invention is intended to be added to polymers of vinyl chloride to form such products as flexible PVC films.

The basic PVC polymeric material which will form a major part of the final product is well known in the art. These materials include polymers produced not only by polymerizing vinyl chloride monomer to produce polyvinyl chloride homopolymer, but also those formed by copolymerizing vinyl chloride monomer with other ethylenically unsaturated aliphatic monomers having molecular weights generally under about 260 which are copolymerizable with vinyl chloride to produce polyvinyl chloride. Such comonomers include olefins, such as ethylene, propylene and the like; vinylidene monomers, such as vinyl esters of monobasic organic acids containing 1 to 20 carbon atoms (e.g., vinyl ether, 2-ethylhexyl vinyl ether, benzyl vinyl ether, etc.) and vinylidene chloride; alkyl acrylate esters in which the alkyl group contains 1 to 20 carbon atoms (e.g., methyl acrylate, butylacrylate, octadecyl acrylate, etc.) and the corresponding alkyl methacrylate esters; and dialkyl esters of dibasic organic acids in which the alkyl groups contain 2 to 8 carbon atoms (e.g., dibutyl fumarate, diethyl maleate, etc.)

Preferred vinyl chloride polymers have chlorine contents ranging from about 45.0 to about 56.7% and have molecular weights such that a 0.4% by weight solution of such polymer in cyclohexanone at 25° C. has a specific viscosity of from about 0.3 to about 0.6. More preferred specific viscosities range from about 0.4 to about 0.5. A preferred class of vinyl chloride polymer is polyvinyl chloride homopolymer. In general, one should choose a vinyl chloride polymer for use in the present invention which will offer most satisfactory properties in a particular desired endproduct, e.g., a heat fused sheet or film product.

The plasticizer formulation of the present invention is added to said PVC polymers in an amount ranging from about 10 to about 70 weight parts per hundred parts of the PVC polymer, in order to form the desired PVC product. In addition to the plasticizer formulation described herein, the PVC product may contain such conventional additives as stabilizers, fillers, colorants, processing aids, lubricants, co-plasticizers, etc., if needed, in conventional amounts. Persons of ordinary skill in the art would be able to select appropriate additives for particular purposes from an examination of such well-known texts as Modern Plastics Encyclopedia, Vol. 52, No. 10A which discusses such additives and contains listings of representative ones that may be used in PVC polymer formulations.

The plasticizer formulation of the present invention contains three basic components: (a) a plasticizer which is compatible with PVC; (b) a haloalkyl phosphate flame retardant; and (c) dimethyl methylphosphonate.

The PVC compatible plasticizers which form one major component of the composition of the present invention are any of the conventional plasticizers that are well known to persons of ordinary skill in the art. Illustrative of such primary plasticizers for use in the present invention are the various chain length monomeric, oligomeric and low polymeric esters such as the medium and higher alcohol esters of various carboxylic acids including the octyl, 2-ethylhexyl, dodecyl and palmityl alcohol esters of phthalic, adipic, azelaic and/or sebacic acids. The polyester polymeric plasticizers include the dimers, trimers and other low polymers of polybasic carboxylic acids and polyhydric alcohols such as formed from such dibasic acids as adipic and such glycols as ethylene, propylene, hexylene and dipropylene glycol. Compatible mixtures of the foregoing can be used, if desired. The formulation of the present invention may contain anywhere from about 5% to about 50%, by weight, of such plasticizers, for example, from about 10% to about 30%, by weight.

The second essential component of the plasticizer formulation of the present invention is a haloalkyl phosphate flame retardant which when combined with the plasticizer in a flexible PVC formulation enhances the flame retardancy of such a formulation. Unfortunately, these flame retardants also have heretofore undesirably increased the haze values of the desired endproduct. Representative haloalkyl phosphates are those containing chlorine or bromine substitution and lower alkyl groups, for example, those containing from about 1 to about 3 carbon atoms. Examples of flame retardants of this class are tris(dichloropropyl)phosphate, tris(dibromopropyl)phosphate, tris(chloropropyl)phosphate, tris(chloroethyl)phosphate, and bis(dichloropropyl)ethylphosphate. If desired, compatible mixtures of the foregoing flame retardants can be used. Generally the amount of such flame retardants in the plasticizer formulation will range from about 30% to about 70%, by weight of the formulation, for example, from about 40% to about 60%, by weight.

An optional ingredient in the plasticizer composition can be a secondary plasticizer such as one of the esters of polyhydric alcohols such as pentaerythritol, sorbitol, mannitol, trimethylolpropane, and the like, with monobasic $C_1$–$C_{10}$ alkyl group containing acids, such as acetic, butyric and heptanoic acids. Generally, the amount used will range anywhere from about 5% to about 15%, by weight of the primary plasticizer.

The weight ratio of flame retardant to primary plasticizer (and, if present, secondary plasticizer) can be varied quite widely depending upon the precise environment in which the formulation is to be used, the desired degree of plasticization and flame retardancy, and the physical properties which are desired for the product. Generally, the phosphate flame retardant will be present in slight excess. A particularly preferred weight ratio of phosphate to plasticizer(s) has been found to be about 5:3. However this can be varied depending upon the factors discussed above, e.g., from about 4:6 to about 7:3.

As stated before, plasticizer compositions containing the aforementioned plasticizer or plasticizers and flame retardant are well known but cause undesired haze values which are not caused by the composition of the present invention.

The final major and essential additive of the plasticizer formulation of the present invention is dimethyl methylphosphonate, in an effective amount to cause reduction of any desired haze that may be caused in the PVC formulation which ultimately will contain the plasticizer formulation. If desired, this component may, for example, comprise from about 5% to about 40% of the formulation, for example, about 10% to about 30%, by weight.

The flame retardant, plasticizer mixture of the present invention is formed by simply mixing the various components which form it until a homogeneous liquid is produced.

The following Examples illustrate the plasticizer formulation of the present invention as well as the use of the formulation in producing a flexible, flame retardant PVC film of good clarity and sparkle.

EXAMPLE 1

This Example illustrates the enhancement in the haze and luminous transmittance realized by the use of the present invention.

Two plasticizer mixtures, as described below, were milled into flexible PVC films and their haze and luminous transmittance was measured by a hazemeter (Hunter Color Difference Meter D25D-2) in accordance with ASTM D1003-61. The basic formulation was 100 parts by weight of medium molecular weight PVC homopolymer resin (available as "SCC-616" from Stauffer Chemical Company, Plastics Division), 50 parts by weight of the particular plasticizers mixture, 0.75 parts by weight of a barium-cadmium liquid stabilizer (available as "Mark LL", from Argus Chemical Corp.) and 0.5 parts by weight of stearic acid lubricant.

The control plasticizer mixture contained 50 parts by weight of tris(dichloropropyl)phosphate flame retardant (available as Fyrol® FR-2 from Stauffer Chemical Company, Specialty Chemical Division), 20 parts by weight of a mixed linear $C_6$–$C_{10}$ dialkyl ester of phthalic acid plasticizer, and 10 parts by weight of the pentaerythriol ester of butyric and heptanoic acids. The mixture of the present invention also contained 20 parts by weight of dimethyl methylphosphonate.

The control's transmission haze was 10.2%, whereas the haze reading for the blend made in accordance with the present invention was only 3.7%. This haze reading represents the percentage of transmitted light which, when passing through the specimen, deviates more than 2.5° from the incident beam by forward scattering. A lower percentage figure is desired.

EXAMPLE 2

This Example illustrates the physical properties of a series of plasticized polyvinyl chloride (PVC) films containing various commercial plasticizers and a blend containing the additive of the present invention. In all cases 50 parts by weight of a particular plasticizer formulation was milled into the type of flexible film described in Example 1.

The Table that follows sets forth the results that were obtained. Formulation No. 1 is the formulation of the present invention whereas the others are commercially available formulations for the same end use having a different chemical makeup.

TABLE 1

|  | PLASTICIZER NO. | | | | |
| --- | --- | --- | --- | --- | --- |
|  | 1 | 2 | 3 | 4 | 5 |
| Tensile Strength, at Break (psi)[1] | 3310 | 3124 | 3187 | 2410 | 3218 |
| % Elongation at Break[2] | 289 | 229 | 237 | 259 | 333 |
| 100% Modulus (psi)[3] | 2226 | 1986 | 2324 | 1434 | 2049 |
| Shore "A" Hardness[4] | 87 | 79 | 87 | 73 | 90 |
| Clash-Berg Point (° C.)[5] | −13 | −3 | −2 | −19 | −16 |
| Volatility (Aver. % wt. loss)[6] | 3.7 | 3.9 | 2.9 | 4.9 | 4.0 |
| LOI[7] | 35.0 | 31.3 | 30.7 | 22.8 | 30.5 |
| Char Length[8] | 1.66 | 2.09 | 2.06 | 7.00 | 1.84 |
| Smoke Curve Area[9] | 15.13 | 15.93 | 13.41 | 21.0 | 15.13 |

TABLE 1-continued

| | PLASTICIZER NO. | | | | |
|---|---|---|---|---|---|
| | 1 | 2 | 3 | 4 | 5 |
| Smoke Index[10] | 365 | 420 | 353 | 170 | 365 |

Footnotes:

Plasticizer No. 1 is the blend made in accordance with the present invention and consists of 50%, by weight, tris (dichloropropyl)phosphate flame retardant (available as Fyrol®FR-2 from Stauffer Chemical Company, Specialty Chemical Division), 20%, by weight, of a mixed linear $C_6$-$C_{10}$ dialkyl phthalate platicizer, 20%, by weight, dimethyl methylphosphonate and 10% by weight of the pentaerythritol ester of butyric and heptanoic acids which is a solvating agent.

Plasticizer No. 2 is 100% cresyl diphenyl phosphate.

Plasticizer No. 3 is a commercially available alkyl triaryl phospate.

Plasticizer No. 4 is a dioctyl phthalate.

Plasticizer No. 5 is phorphorus containing flame retardant plasticizer available as Fyroflex® 2800 from Stauffer Chemical Company, Specialty Chemical Division.

[1]This is the maximum tensile stress sustained by a specimen of the resin during a tension test. The result is expressed in pounds per square inch with the area being that of the original specimen at the point of rupture rather than the reduced area after break. It is measured by ASTM D 1623.

[2]In tensile testing elongation is the increase in length of a specimen at the instant before rupture occurs. Percent elongation is expressed as the increase in distance between two gauge marks at rupture divided by the original distance between the marks, the quotient being multiplied by 100. It is measured by ASTM D 1623.

[3]This is the tensile strength in pounds per square inch needed to elongate a specimen to 100% of its original length. It is measured by ASTM D 1623.

[4]This is a measure of indentation hardness and is measured on the Shore A durometer after 10 seconds. This instrument comprises a spring loaded indentor point with a load of 822 grams projectingthrough a hole in a presser foot. The device has a scale which indicates the degree of penetration into the plastic beyond the face of the foot. The scale ranges from 0 (for 0.100) inch penetration to 100 (for zero penetration).

[5]This is the temperature at which the apparent modulus of elasticityof a specimen is 135,000 psi. It is the end of flexibility of the sample as defined by Clash and Berg in their studies of low temperature flexibility. This point can be determined by ASTM D 1043.

[6]This is the average percent weight loss of three 2"×2" samples which have been exposed to activated carbon for 24 hours at 90° C. in accordance with ASTM 1203-61T.

[7]This is an abbreviation for the Limiting Oxygen Index and is defined as the minimum mole percent $O_2$ content required in an oxygen/nitrogen mixture to maintain combustion of a vertical, top-lighted test sample. Higher numbers are indicative of a more fire retardant material. It is determined by the method described by Fenimore and Martin in the November 1966 issue of Modern Plastics.

[8]The char length is a measure of flammability obtained in accordance with the procedure described by L. Allison et al. in SPE Technical Papers, pp. 656–658 (31st Annual SPE Technical Conference, May 1973). The figure represents the char length in inches and lower numbers are desired.

[9]The smoke curve area is a measure of the total amount of smoke produced, not taking into account differences in flammability measured in accordance with the test mentioned in footnote 8. This is a measure of the amount of smoke given off when the vinyl is completely burned in an external fire and lower numbers are desired.

[10]The smoke index is the total amount of smoke produced per unit volume of burned film measured in accordance with the test mentioned in footnote 8. It is the amount of smoke evolved from a vinyl object when it has been ignited and allowed to burn andself extinguish. Lower numbers are desired.

The foregoing are merely illustrative of certain preferred embodiments of the claimed invention. The scope of protection that is sought is set forth in the claims which follow.

What is claimed:

1. An improved flame retardant, plasticizer formulation comprising a polyvinyl chloride compatible plasticizer and a haloalkyl phosphate flame retardant, said formulation being adapted to be added to polyvinyl chloride polymers, wherein the improvement comprises an effective amount of dimethyl methylphosphonate for reduction of haze when the formulation is added to said polyvinyl chloride polymers.

2. A formulation as claimed in claim 1 which also contains a secondary plasticizer which is an ester of a polyhydric alcohol and a monobasic acid.

3. A formulation as claimed in claim 1 wherein the plasticizer comprises from about 5% to about 50%, by weight, of the formulation.

4. A formulation as claimed in claim 3 wherein the plasticizer comprises from about 10% to about 30%, by weight of the formulation.

5. A formulation as claimed in claim 1 wherein the haloalkyl phosphate comprises from about 30% to about 70%, by weight, of the formulation.

6. A formulation as claimed in claim 5 wherein the haloalkyl phosphate comprises from about 40% to about 60%, by weight, of the formulation.

7. A formulation as claimed in claim 1 wherein the haloalkyl phosphate is selected from the group consisting of the chlorinated and brominated $C_1$-$C_3$ alkyl phosphates.

8. A formulation as claimed in claim 7 wherein the phosphate is selected from the group consisting of tris(dibromopropyl)phosphate, tris(chloropropyl)phosphate, tris(chloroethyl)phosphate and bis(dichloropropyl)ethylphosphate.

9. A formulation as claimed in claim 1 wherein the dimethyl methylphosphonate is present at from about 5% to about 40% by weight of the formulation.

10. A formulation as claimed in claim 1 wherein the dimethyl methylphosphonate is present at from about 10% to about 40% by weight of the formulation.

11. A formulation as claimed in claim 1 which comprises from about 5% to about 50% by weight of plasticizer, from about 30% to about 70%, by weight, of tris(dichloropropyl)phosphate, and from about 5% to about 40%, by weight of dimethyl methylphosphonate.

12. A formulation as claimed in claim 1 which comprises from about 10% to about 30% by weight of plasticizer, from about 40% to about 60%, by weight, of tris(dichloropropyl)phosphate, and from about 10% to about 40%, by weight, of dimethyl methylphosphonate.

13. A formulation as claimed in claim 12 which also contains from about 5% to about 15% by weight of a secondary plasticizer which is an ester of a polyhydric alcohol and a monobasic acid.

14. A formulation as claimed in claim 13 wherein the secondary plasticizer is an ester of a polyhydric alcohol and a $C_1$-$C_{10}$ alkyl group containing acid.

15. A formulation as claimed in claim 13 wherein the secondary plasticizer is an ester of pentaerythritol and a $C_1$-$C_{10}$ alkyl group containing acid.

16. A plasticized polyvinyl chloride polymer containing an effective amount for plasticization and flame retardance of the formulation of claim 1.

* * * * *

UNITED STATES PATENT AND TRADEMARK OFFICE
CERTIFICATE OF CORRECTION

PATENT NO. : 4,111,882
DATED : September 5, 1978
INVENTOR(S) : John H. Deatcher

It is certified that error appears in the above–identified patent and that said Letters Patent are hereby corrected as shown below:

Col. 3, line 43, "desired" should be -- undesired --; and

Col. 5, line 45, -- Examples -- should appear after "foregoing".

Signed and Sealed this

Twenty-fourth Day of April 1979

[SEAL]

Attest:

RUTH C. MASON
Attesting Officer

DONALD W. BANNER
Commissioner of Patents and Trademarks